Sept. 17, 1940.  C. L. EKSERGIAN  2,214,762
BRAKE
Original Filed Aug. 19, 1937    2 Sheets-Sheet 1
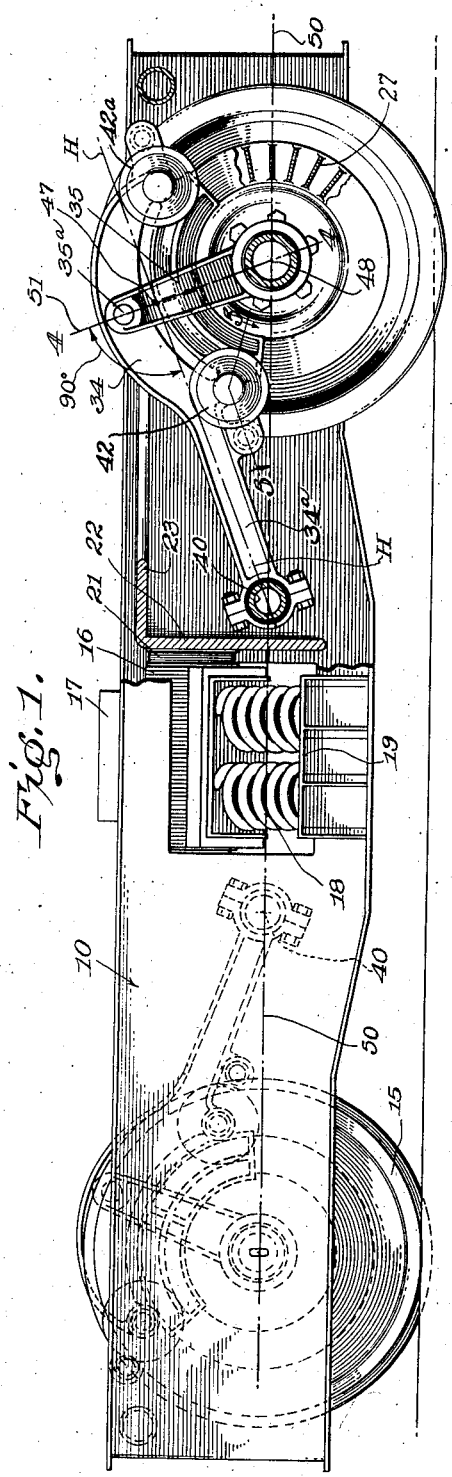
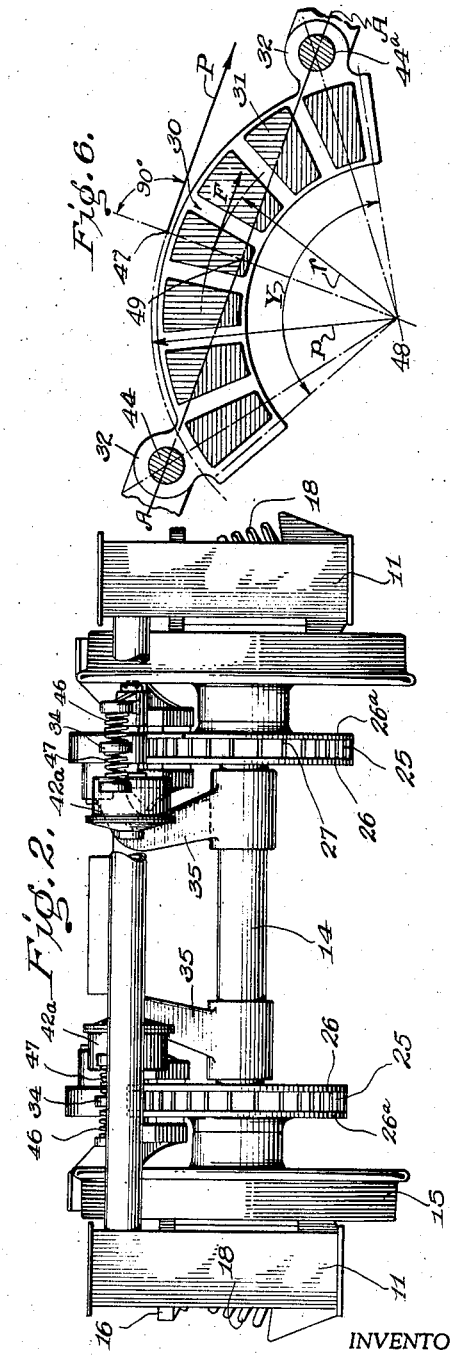
INVENTOR.
Carolus L. Eksergian
BY
John P. Barbox
ATTORNEY.

Sept. 17, 1940. C. L. EKSERGIAN 2,214,762
BRAKE
Original Filed Aug. 19, 1937 2 Sheets-Sheet 2
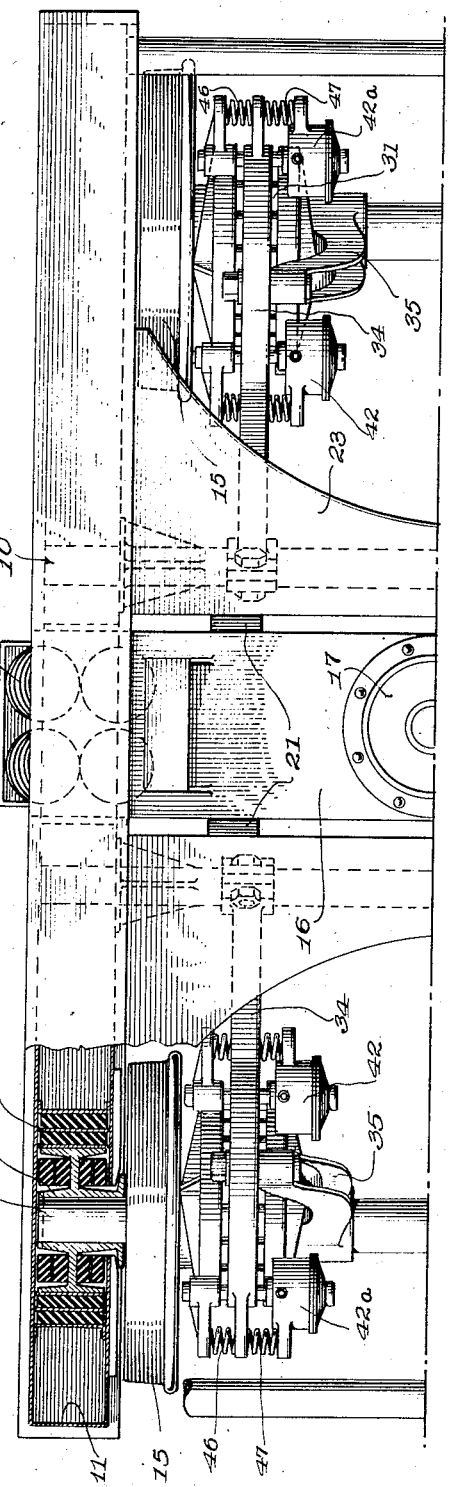
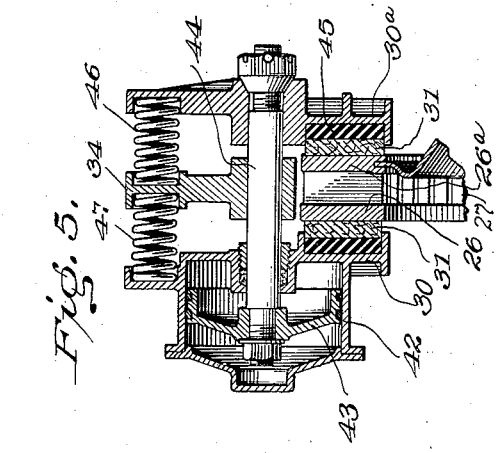
INVENTOR.
Carolus L. Eksergian
BY
ATTORNEY.

Patented Sept. 17, 1940

2,214,762

UNITED STATES PATENT OFFICE 2,214,762

BRAKE

Carolus L. Eksergian, Detroit, Mich., assignor to Edward G. Budd Manufacturing Company, Philadelphia, Pa., a corporation of Pennsylvania Application August 19, 1937, Serial No. 159,844
Renewed December 11, 1939

26 Claims. (Cl. 188—59)

The invention relates to improvements in brakes and more particularly to an improved brake for railway purposes.

The typical railway brake which has the shoes applied to the wheel tread is objectionable not only due to the excessive wear on the wheel tread, but under severe operating conditions, the excessive pressure causes so much heat that there is frequently damage to the wheel structure. With higher speed operation, the tread brakes are not entirely satisfactory.

The principal object of this invention is to provide an improved railway brake which is satisfactory for rapid deceleration of heavy equipment from high speeds.

Another object of the invention is to provide a brake in which a high brake shoe pressure is exerted over but a small portion of the brake surface with the remainder of the surface available for uninterrupted cooling, such uninterrupted cooling portion being substantially greater than the braking portion.

Another object of the invention is to provide an improved brake shoe hanger having a torque resisting arm in which the torque passes substantially directly through the axis of the arm so that it may be of relatively light weight and yet of adequate strength in tension and compression.

A more specific object of the invention is to provide an improved brake disc which is readily adapted for connection to the vehicle wheel and which is adapted to withstand the high working loads of railway service without damage to the wheel itself.

Further objects and advantages of the invention will appear from the following disclosure of a preferred form of embodiment thereof taken in connection with the attached drawings, in which, Fig. 1 is a side elevation with parts broken away and parts in dotted line of a railway truck having the novel brake applied thereto;

Fig. 2 is an end elevation of the truck and applied brake shown in Fig. 1 with parts broken away;

Fig. 3 is a plan view of a half of the truck and applied brake shown in Fig. 1 with parts broken away;

Fig. 4 is a diagrammatic cross section through a wheel and the brake associated therewith taken substantially along the center line of the axle with the axle shown in solid lines, the section being taken substantially along line 4—4 of Fig. 1;

Fig. 5 is a detail vertical cross section through the brake operating mechanism; and Fig. 6 is an inside elevation of a brake shoe.

The railway truck 10, as generally shown in Fig. 1, is provided with suitable side frames each of which may consist of a hollow box section beam, generally indicated at 11 in Fig. 3, which is provided with a rubber supporting construction 12 for the journal 13 in which the axle 14 is carried. The journal 13 is of the outboard type, the details of which are not important, but in this form of embodiment, the axle 14 carries the wheels 15 and, if the axle is of the fixed type, the wheels 15 will rotate in a suitable manner on the axle, whereas, if the wheels 15 are fixed to the axle 14, the axle will rotate suitably in the journal 13. Suitable bearings will be provided in either case.

The truck may also include a bolster, generally indicated at 16 having a center plate 17, the bolster being carried by springs 18 from the spring platform 19 of the side frame, as shown in Fig. 1. The bolster is preferably of a floating type with the springs at an outward inclination tending to resist lateral movement of the bolster and the longitudinal movement of the bolster is resisted by the pads 21 which cooperate with the webs 22, parts of the transoms. The webs 22 are continuations of the horizontal webs 23. They together are the principal transverse members maintaining the rigidity of the truck. It is to be understood that the particular invention of the brake structure hereinafter described may be applied to any suitable truck and that this particular truck is merely illustrative of one form of truck on which such a brake may be placed.

As shown in Figs. 2 and 4, a brake disc preferably of cast metal, such as cast iron, generally indicated at 25, is provided adjacent each wheel, and is secured thereto through a flexible flange 36, preferably, as shown, of sheet metal, which is bolted at 37 to the wheel. Each disc includes two braking surfaces or rings 26 and 26a and an intermediate series of webs 27 which are radial and of substantially uniform width, extending from a point inward of the braking rings 26 and 26a to their outer peripheries. These webs serve to establish a centrifugal action of air, thus causing a substantial flow of air for cooling the interior of the brake rings and, by conduction, their exterior also.

Cooperating with the brake rings 26 and 26a are the brake shoes 30, shown in detail in Fig. 6. Each brake shoe is supported through the hanger collars 32 from the brake shoe anchor 34. Each anchor 34 is preferably pivotally supported by a single hanger arm 35 journaled on the axle 14, as shown in Figs. 3 and 4, so that regardless of the position of the wheels and axles with respect to the truck, the brake shoes 30 may always be maintained concentric with the brake ring surfaces 26 and 26a. While individual supports by separate trunnions 35a are preferred, it will be apparent that other means for maintaining the concentricity of the brake shoe and brake disc may be provided.

Each brake shoe is faced with a plurality of separate brake blocks 31 of composite brake material. Each brake block 31 is supported from its brake shoe 30 by an intermediate rubber pad cushion 45 so that regardless of any variation of the brake rings, a substantially constant uniform pressure per square inch will be exerted by the respective brake blocks on the rings.

The operation of the brake shoes is preferably by pneumatic pressure, and, as shown in Fig. 5, brake cylinders 42 are integrally mounted on one brake shoe 30 and within each of these cylinders is a piston 43 mounted on the piston rod or link 44 which is attached to the opposite brake shoe 30a. When the pressure is applied, the piston 43 tends to move toward the outer part of cylinder 42 setting up a reaction which will force the respective brake shoes 30 and 30a against the brake rings 26 and 26a. Opposed springs 46 and 47 are mounted between the anchor arm 34 and the brake shoes 30 to force the braking surfaces apart when the pressure is released.

The brake cylinders 42 and 42a, and the respective piston rods 44 and 44a are preferably located on the chordal axis of symmetry of the respective brake shoes 30. This axis is represented by the line A—A in Fig. 6. It is obtained by equalizing the areas of the brake blocks 31 above the axis with the brake block areas below it. It may be said to be an axis of axial pressure. The normal forces of application by the brake cylinders are thus evenly distributed on the brake blocks 31 so that a uniform intensity exists throughout each shoe, and there is no appreciable warping of the brake shoes. The brake shoe may be readily reinforced by suitable ribbing as a single beam for the necessary rigidity. (See Fig. 4.)

The brake anchor 34, as will be seen in Fig. 1, is provided with an extension portion 34a through which it is connected to a transverse truck member 40 by which the braking torque is resisted. It is desirable that this support lie on the horizontal wheel center line in order that the entire assembly operate in effect as a unit rotating about the wheel axis. It will be seen that if the wheel axis remains fixed and the truck side frame 11 has a total vertical travel of approximately two inches, the corresponding vertical travel of the torque support 40 is approximately a straight line and produces virtually no change in the distance between the centers of 40 and 48. An arc described about the wheel axis at the torque support 40 within the distance of one inch above and of one inch below the center line is also approximately a straight line. Thus the triangle of centers of 40, 48 and 35a remains substantially unaltered and the concentric relation of shoes 30 to discs 26 and 26a does not change.

It is also highly desirable that the shoe reactions incur no additional loads on the anchors 34 and their extensions 34a because of bending moments. This is particularly desirable in order to keep the radial suspension members 35 as light as possible. If the anchor 34, 34a need be constructed only for direct tension and compression loads, their strength and weight may be reduced. This is accomplished by having the resultant of all the friction forces of each pair of shoes, (which passes through the center of drag 47), coincide approximately with the center line of their anchor 34, 34a and pass through the member 40. Such resultant and center line is designated H—H. Then when the center line 35a, 48 of arms 35 makes a right angle with this resultant, the arm lies in the radial plane of symmetry of the shoes of the pair and is subjected to radial supporting loads only, free from bending moments due to braking reactions. Both its main body and its bearing on axle 14 may therefore be light. The hanger arm is then subjected to direct compression and tension loads only.

The center of drag of a shoe is obtained by compounding the drag forces of the respective blocks 31. The drag force of each block takes at a different tangent. The distance R of the brake center of drag 47 for a brake shoe having an angular extent of 120° is approximately 1.23 times the mean radius of the brake shoes. If the shoe angle is increased beyond 120°, the factor $$\frac{p}{r}$$

increases at a rapid rate, up to 180° shoe angle.

I have found it especially desirable to limit the brake shoes to a segment of approximately 120° and to increase the unit brake shoe pressure so that all of the work done is on a comparatively small area of the disc. As the remainder of the disc (approximately 240°) is available for uninterrupted cooling, the temperature of the disc as it reaches the shoes is kept down to a relatively low point. The segmental division of braking and cooling insures a high temperature differential between the brake blocks 31 and the segment being braked. This makes for most efficient heat dissipation. The temperature of the segmental shoes does not and cannot reach as high a point as would be the case if the same braking torque was derived from the disc at large. In such case, the temperature of the shoes and disc tends continually to increase, whereas with a very high temperature over a relatively short segment of the disc, the cooling is as great or greater than the heating.

The particular extent of the segment appears to be approximately critical under railway operating conditions. It has been found that if a smaller segment is used, the unit pressure may exceed the resistance of the best composition brake lining obtainable and cause a destruction of it, or the temperatures will become so great for the relatively short brake period as to exceed a critical point, the latter then not only inviting the former but also damaging the braking disc. Furthermore, if the brake shoes have an extent materially greater than 120° it is found that the cooling curve has an insufficient time to reach a mean temperature with the result that the increase of the base temperature becomes so great that over a relatively short period the total temperature exceeds the critical point. I have found that the 240° uninterrupted cooling time is best for fullest cooling of the disc. Division of the brake shoes into diametrically opposite pairs of the same aggregate area will cause undue heating, whereas the same brake shoe surface concentrated in segments will not.

I find that a brake shoe pressure of the order of one hundred forty pounds per square inch maximum is adequate for the most severe operating conditions. Such a pressure can be readily obtained by the two such brake cylinders as shown having an approximate diameter of 7" and a fluid pressure of 75–90 pounds per square inch.

The brake herein shown and described is similar to that shown in a copending application filed of even date herewith, Serial No. 159,862, for Brake in which the relation between the brake and the spring suspension of the truck is claimed.

While I have shown a preferred form of embodiment of my invention, I am aware that other embodiments may be given it, and I therefore desire a broad interpretation of my invention within the scope and spirit of the description herein and of the claims appended hereinafter.

What I claim is:

1. In combination with a rotor having a disc rotated thereby, a segmental brake shoe and means to move said brake shoe into contact with said disc, said means being mounted at opposite ends of the segmental brake shoes and substantially on the chordal axis of symmetry of the brake shoe.

2. A brake for a wheeled vehicle having a disc interconnected with a wheel thereof, a plurality of brake shoes of segmental form for contact with opposed faces of said disc and a plurality of actuating means setting up a reaction between said brake shoes for braking movement against said disc, said actuating means being arranged at opposite ends of the shoes and on the chordal axis of symmetry of the brake shoes.

3. In a railway truck having a plurality of wheels, a disc connected for rotation with one of said wheels, a plurality of opposed segmental brake shoes and fluid pressure means to move said brake into contact with opposite sides of said disc, said fluid pressure means including movable means interconnecting the opposed shoes on extensions of the chordal axis of symmetry of the brake shoes.

4. In a railway truck having a plurality of wheels, a disc connected for rotation with one of said wheels, a plurality of opposed segmental brake shoes acting respectively on opposite sides of said disc, fluid pressure means to move said brake shoes into contact with said disc, said fluid pressure means including a plurality of cylinders directly acting on one shoe and each having a piston therein connected with the opposed shoe, the reactions lying on extensions of the chordal axis of symmetry of the brake shoe, and means to support said brake shoes concentrically with respect to said disc.

5. In combination with a rotor having a disc connected thereto, a segmental brake shoe, means to move said brake shoe into braking contact with said disc to set up a braking torque, and means to resist the torque of said brake shoe, said means being substantially in alignment with the resultant tangential drag of said brake shoe.

6. A railway truck having supporting wheels, a disc carried by one of said wheels, a pair of opposed segmental brake shoes, means to support said brake shoes in concentric relation with said disc, and means to resist the torque reaction of said support, said torque resisting means being substantially in alignment with the resultant tangential drag of said brake shoes and thereby being subjected principally to tension and compression reactions from said torque.

7. In a resiliently supported vehicle having wheels, a brake disc rotatable with one of said wheels, a brake shoe, means to move said brake shoe into braking contact with said disc, an anchor support for said brake shoe, and means to attach said support to the vehicle substantially in the horizontal plane of the horizontal axis of the wheel, whereby the relative deflection of the vehicle and the wheels has no appreciable effect on the brake shoe position with respect to the disc.

8. A brake according to claim 5, in which a brake hanger connects the shoe with the axis of the disc for concentric movement thereabout.

9. A brake according to claim 5, in which a brake hanger lying in the axial plane of symmetry of said brake shoe connects the brake shoe with the axis of the disc for concentric movement thereabout.

10. A brake according to claim 5 in which the torque resisting means is an anchor arm connected with the brake shoe in fixed longitudinal relation, and a brake shoe hanger pivotally interconnects the anchor arm and the point lying substantially on the axis of the disc.

11. A brake according to claim 1 in which a brake shoe hanger interconnects the shoe and the axis of the disc substantially in the radial plane of symmetry of the shoe.

12. A brake according to claim 6 in which the torque resisting means is an anchor arm and the brake shoe is supported by a hanger to an axis substantially on the disc axis and substantially at right angles to the anchor arm.

13. A brake according to claim 4 in which the concentric support of the brake shoes is concentric with the cylinders and pistons.

14. A brake according to claim 2 in which a brake anchor arm common to the brake shoes lies in their medial trans-axial plane.

15. A brake according to claim 4 in which a brake anchor arm common to the shoes lies in their medial trans-axial plane and is trans-connected with the shoes through the pistons.

16. A brake according to claim 2 in which a common brake arm lies in the medial trans-axial plane of the shoes and opposed retracting springs lie between opposite sides of the anchor arm and the respective shoes.

17. A brake having radial braking faces and brake shoes coacting therewith, the brake shoes being faced with separate blocks of composite material connected with the body of the shoe through substantially co-extensive resilient rubber pads of a thickness approaching the thickness of the blocks, whereby the blocks can individually adjust themselves to the braking faces.

18. A railway truck according to claim 6 in which the disc directly connects with the wheel, and means to support brake shoes in concentric relation comprises a connection with the axle of the wheel on the opposite side of the disc from the wheel.

19. In a railway truck, a brake disc associated with a wheel thereof, said brake disc comprising a supporting flange secured to the wheel and supporting at its periphery braking rings spaced from each other and interconnected by transverse spaced webs and secured through one of said rings to the periphery of said flange, the braking rings and their interconnecting spaced webs forming radial passages for the free circulation of air whereby the disc acts as a centrifugal blower, and a pair of segmental brake shoes arranged to engage the outer faces of said rings through an arc of substantially 120° and the remaining substantially 240° of said faces being free of shoe engagement and subject to the cooling action of the centrifugal blower.

20. In combination with a wheel, a cast metal annular brake member having peripherally thereof spaced rings connected by spaced transverse webs forming radial cooling passageways between the rings, said rings having opposed radial braking surfaces, and a mounting flange forming the sole support for said rings and having its peripheral margin embedded in one of said rings and spaced axially from the wheel and its central portion rigidly secured to said wheel in axially offset relation to its peripheral portion.

21. In a brake, a cast metal annular brake member comprising spaced rings having opposed radial braking faces and interconnected by spaced radial webs thereby providing radial passageways for cooling air between the rings, and a mounting flange forming the sole support for said rings, having its peripheral margin embedded in one of said rings and its central portion adapted to be secured to a wheel.

22. In a brake, a cast metal annular brake ring having radial braking surfaces and radial passageways between said braking surfaces for the passage of cooling air, and a mounting flange forming the sole support for said ring and having its peripheral margin continuously embedded in said ring at one side of said passageways, the mounting flange being flexible to permit expansion and contraction of said ring.

23. In combination with a wheel, a cast metal annular brake ring having radial braking surfaces and radial passageways between said surfaces for the passage of cooling air, and a mounting flange forming the sole support for said ring and rigidly secured centrally to the wheel, and having its peripheral margin spaced from the wheel and secured to said ring at one side of said radial passageways, the mounting flange being flexible to permit slight axial floating of said ring.

24. A brake according to claim 5 in which said means in substantial alignment with the resultant tangential drag of the brake shoe is in association with a member mounting the brake shoe and supported against rotation with respect to said rotor.

25. A brake according to claim 5 in which the rotor comprises a rolling support for a truck frame and said means in substantial alignment with the resultant tangential drag of the brake shoe is in association with a member mounting the brake shoe and supported on the axis of said rolling support and the truck frame.

26. A brake for vehicles having a wheeled axle, a radial disc secured to rotate with a wheel on said axle, a pair of brake shoes mounted for axial movement to engage opposite sides of the disc to apply the brake, a support for said shoes extending between the axle and a transverse member of the vehicle frame, and a cylinder for actuating said shoes also carried by said support.

CAROLUS L. EKSERGIAN.